March 6, 1928.
H. V. RIEHL
1,661,960
INJECTOR OR ASPIRATOR
Filed April 4, 1927
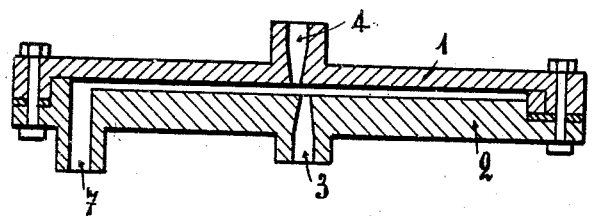
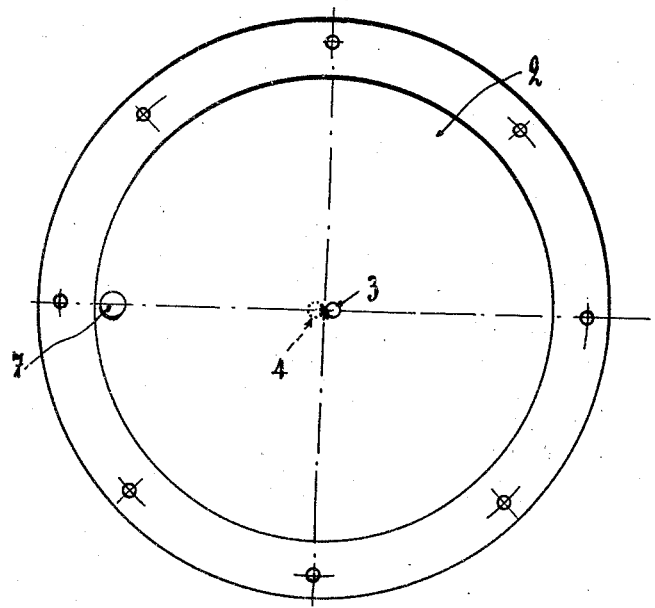
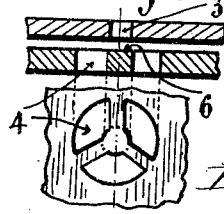
Inventor
Henri Victor Riehl,
by Connolly Bros.
Attorneys.

Patented Mar. 6, 1928.

1,661,960

UNITED STATES PATENT OFFICE.

HENRI VICTOR RIEHL, OF VERSAILLES, FRANCE.

INJECTOR OR ASPIRATOR.

Application filed April 4, 1927, Serial No. 180,984, and in France April 12, 1926.

The present invention relates to an apparatus which is adapted for the entraining of a fluid of a liquid or a gaseous nature by another fluid of a liquid or a gaseous nature, whereby the resulting mixture is enabled to accumulate in a closed vessel, in spite of the counter-pressure which is produced in said vessel, and to a limit which is greatly in excess of the limit afforded by the known entraining apparatus.

The invention consists in the disposition of two walls which are parallel (or approximately so) and are close together, each wall being pierced with an orifice; the latter are not situated upon the same axis, but are so disposed that the projection of either orifice on the opposite wall is tangent or approximately tangent to the periphery of the other orifice, so that if one orifice delivers a stream of fluid under pressure, this stream will break upon the opposite wall and will produce a powerful suction in the other orifice which is in communication with the fluid to be projected, this suction depending upon the speed of the stream of fluid under pressure. This suction will be produced irrespectively of the form of the said parallel walls, whether round, rectangular, elliptical, curved, distorted, concave or convex and other outlines may be employed.

No breach of continuity or apertures can be allowed between the delivery and the suction orifices and the peripheral edges of the walls. If the said peripheral walls have a circular shape, and if the fluid mixture to be projected is not obliged to overcome a counter-pressure, the said edges may be left free; but if the mixture to be projected is to be delivered into a closed vessel in which it accumulates and is compressed, or if it is to overcome a certain pressure, the peripheral edges of the walls must be connected together so as to form a closed space, and one or more orifices are formed on the said periphery whereby the said space will be connected with the said closed vessel.

When the stream of the entraining fluid is caused to break upon the said wall, it will be divided into a certain number of radiating secondary streams leaving between them various spaces which are at once occupied by the fluid drawn forward, and the said fluid is thus mechanically conveyed to the periphery by the said radiating streams; the latter will become separated as they proceed from the center, and will thus offer a greater space for the fluid which is drawn forward, and when at a certain distance, this fluid will become rarefied to a degree which may attain the value of a vacuum according to the nature of the fluid employed. This vacuum, when combined with the mechanical action of the said radiating streams, will aid in increasing the force of the suction.

When at the periphery, the fluids will strike against the peripheral portion which unites the two parallel walls; they will accumulate at this point and will become compressed, thus forming a ring consisting of mixed fluids under pressure, and these latter will issue through orifices provided for the purpose with a force which will overcome a great resistance due to counter-pressure. The region of the vacuum and the high pressure is determined by the proper choice of the length between the centre and the periphery, and also by the shape of the edges, by which the length of their periphery is obviously determined.

The invention is shown by way of example in the appended diagrammatic drawings, wherein:—

Fig. 1 is a vertical section, on a diameter, of the said apparatus in its theoretical form.

Fig. 2 is a plan view of the lower plate of the apparatus shown in Fig. 1.

Fig. 3 is a sectional and plan view of a construction which is modified as concerns the shape of the suction and the delivery orifices.

The said apparatus comprises two plates or walls 1 and 2 which are circular as shown in Fig. 2, or rectangular, square or spherical, which may be fitted into one another or may assume the form of a tube which is flattened and is then bent into a U shape, or the said walls may in general be given all forms which are compatible with the use which is to be made of the same.

At the centers of the lower and the upper plates are situated the respective orifices for the motive fluid 3 and for the suction 4 which are projected tangentially as shown in the plan view Fig. 2. The said orifices may be disposed as shown in Fig. 3, i. e. in such manner that the issuing stream will impinge upon the portion 6 of the wall, the suction orifices having the eccentric position with reference to this point. The said orifices might be placed elsewhere than at the center of the surface of the walls. For example, if the said walls have a rectangular shape, the orifices may be disposed at the end of the rectangle, but herein the radiating streams will not have a uniform length, and the entraining will depend upon this factor.

The mixed fluids are discharged through one or more orifices 7 which are formed in the periphery of the said walls.

According to the direction which is given to the axis of the discharge orifice, which is perpendicular to the plane of the surface of the walls in this example but which may be inclined from the perpendicular, I may produce an oblique stream which causes the formation of curved secondary streams, thus producing a rotary and whirling motion which furthers the preservation of the kinetic energy of the fluids.

The apparatus will operate with all fluids whether of a liquid or gaseous nature, and it will serve for the entraining of substances having the character of dust or syrup, as well as for the production of a vacuum, or for compression, or for like purposes, and in fact the said apparatus has a wide field of application.

I claim:—

1. An apparatus for entraining and compressing gaseous or liquid fluids, which essentially comprises two walls with parallel surfaces, which are close together and are both pierced with an orifice, the projection of either orifice upon the opposite wall being tangent to the periphery of the other orifice, one of the said orifices serving for the motive fluid and the other for the suction.

2. An apparatus for entraining and compressing fluids, which comprises two walls with parallel surfaces, each wall being pierced with an orifice which is tangent to the projection of the other, one of the said orifices serving for the suction and the other for the motive fluid, the said walls being connected together at their periphery in such manner as to form a closed space one or more orifices being provided on the said periphery for the discharge of the mixed fluids.

3. An apparatus for entraining and compressing fluids, which comprises two walls with parallel surfaces, each wall being pierced with an orifice which is tangent to the projection of the other; the walls of each orifice being inclined from the perpendicular to the plane of the walls; one of the said orifices serving for the suction and the other for the motive fluid, the said walls being connected together at their periphery in such manner as to form a closed space, one or more orifices being provided on the said periphery for the discharge of the mixed fluids.

In testimony whereof I affix my signature.

HENRI VICTOR RIEHL.